United States Patent [19]

Lee

[11] Patent Number: 5,008,361

[45] Date of Patent: Apr. 16, 1991

[54] CRYSTALLINE POLYIMIDESILOXANES

[75] Inventor: Chung J. Lee, Amherst, N.Y.

[73] Assignee: Occidental Chemical Corporation, Niagara Falls, N.Y.

[21] Appl. No.: 459,498

[22] Filed: Jan. 2, 1990

[51] Int. Cl.$^5$ .............................................. C08G 77/04
[52] U.S. Cl. ........................................ 528/26; 528/38; 528/41
[58] Field of Search ............................ 528/38, 26, 41

[56] References Cited

U.S. PATENT DOCUMENTS

| | | | |
|---|---|---|---|
| 4,558,110 | 12/1985 | Lee | 528/26 |
| 4,701,511 | 10/1987 | Valenty | 528/38 |
| 4,829,131 | 5/1989 | Lee | 528/41 |

OTHER PUBLICATIONS

L. M. Ruiz in Proc. 3rd SAMPE Electronic Conference, 1989, p. 209.
Stoakley et al. in Proc. 3rd SAMPE Electronic Conference, 1989, p. 224.
Schuckert et al. in "The Evolution of Packaging Dielectrics", published in the Proc. Symp. Packaging of Electronic Devices, edited by P. Bindra and R. A. Susko, Electrochem. So. Inc. (1989), p. 116.
J. Electronics Material, vol. 18(2), (1989), p. 313.

*Primary Examiner*—Melvyn I. Marquis
*Assistant Examiner*—M. Glass
*Attorney, Agent, or Firm*—James F. Tao; Richard D. Fuerle

[57] ABSTRACT

Novel crystalline polyimidesiloxanes are prepared by reacting BTDA, and a siloxane monomer with a diamine selected from bis-4(4-aminophenoxy) phenyl sulfone and 2,2-bis-4(4-aminophenoxy) phenyl propane. The products have low water absorption.

11 Claims, No Drawings

CRYSTALLINE POLYIMIDESILOXANES

BACKGROUND OF THE INVENTION

1. Field of the Invention

Crystalline polyimidesiloxanes are especially useful in electronic applications because of their low water absorption and good adhesion to various substrates used in electronic applications such as printed circuits, computer chips and the like.

2. Prior Art

Polyimides with a low dielectric constant and low absorption of water can be achieved by use of fluorinated monomers such as disclosed by L. M. Ruiz in Proc. 3rd SAMPE Electronic Conference (1989), page 209, and/or by the use of siloxane monomers, such as disclosed by Stokley et al in the same SAMPE conference at page 224. The fluorinated polyimides have high coefficient of thermal expansion (a CTE of over 40 ppm/C and high Young's modulus (over 350,000 psi). These two properties result in high residual stress when the fluorinated polyimides are used for coating on low CTE electronic substrates, such as silicon and alumina. These results are disclosed by Schuckert et al in "The Revolution of Packaging Dielectrics", in P. Bindra and R. A. Susko in the Proc. Symp. Packaging of Electronic Devices, Electrochem. Soc. Inc. (1989), page 116.

Some high performance polyimidesiloxanes have recently emerged as an important class of electronic polymers, such as disclosed by me in "Polyimidesiloxanes: State of the Material and Technology", in C. P. Wong, "Polymers for Electronics and Photonics Applications", Academic Press, to be published in 1990. Other disclosures occur in my papers in J. Electronics Material, Volume 18(2), (1989) at page 313; and Proc. 39th Electronic Components Conference, CHMT, (1989), page 896 and references disclosed therein. These polyimidesiloxanes usually possess a glass transition temperature (Tg) of higher than 200° C., a dielectric constant equal to or lower than 3.0 to 2.6, and a Young's modulus no more than 150,000 psi at room temperature for low stress coating applications. However, all these polyimidesiloxanes are amorphous materials and they absorb a certain amount of water (0.6 to 1.0% maximum) in proportion to their imide contents.

My U.S. Pat. No. 4,558,110 discloses a crystalline silicone-imide block copolymer comprising at least one imide-disiloxane block, wherein the imide portion of said imide-disiloxane block has a symmetrical aromatic radical as its nucleus, and at least one polydiorganosiloxane has at least about five siloxy units.

The purpose of this invention is to provide new low dielectric polyimidesiloxanes which exhibit very low water absorption, such as a maximum of about 0.5 weight percent.

SUMMARY OF THE INVENTION

The invention is based on the discovery that polyimidesiloxanes made from certain monomers normally used in making amorphous polyimides, are crystalline and have low water absorption properties. The number of siloxane monomer units and the block size in these siloxane monomer units can be used to control the molecular weight of the polyimidesiloxanes.

EMBODIMENTS OF THE INVENTION

These new crystalline polymers are made from benzophenone dianhydride (BTDA), a siloxane monomer and one of the following organic diamines.

Bis-4(4-aminophenoxy) phenyl sulfone having the formula

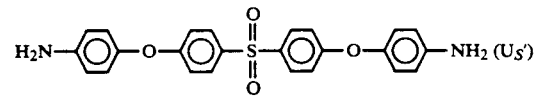

and 2,2-bis-4[4-aminophenoxy phenyl]-propane having the formula

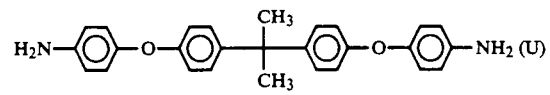

The polymers are prepared by a process which produces an oligomer of the BTDA and the organic diamine to which is reacted the siloxane monomer.

The oligomer of the BTDA and organic diamine contains 1 to 10 repeating units, preferably 1 to 5 repeating units.

THE SILOXANE MONOMERS

Siloxane diamino comoounds that can be used for the present invention have the following formula:

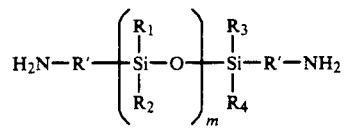

wherein $R_1$, $R_2$, $R_3$, and $R_4$ are independently selected from a substituted or unsubstituted aliphatic mono-radical of 1 to 12 carbon atoms or substituted or unsubstituted aromatic mono-radical of 6 to 10 carbon atoms. Suitable radicals include —$CH_3$, —$CF_3$, —$(CH_2)_nCF_3$, —$C_6H_5$, —$CF_2$—$CHF$—$CF_3$ and

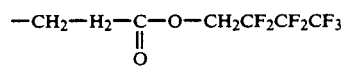

R' is a di-radical of the foregoing type. Suitable di-radicals include —$CH_2$—$_n$, —$CF_2$—$_n$, —$(CH_2)_n(CF_2)_m$— and —$C_6H_4$—, wherein m and n=1 to 10.

In general, the employment of the α,w-diaminosiloxane and α,w-dianhydride siloxane are interchangeable in the present invention. However, for making polyimidesiloxanes of high glass transition temperature, the mole percent of the mixture of dianhydrides in the total dianhydride should be maximized; and therefore, it is more desirable to employ the combination of the organic dianhydride with an organic diamine and an α-w-diaminosiloxane.

Siloxane dianhvdrides which can be incorporated instead of or in addition to the siloxane diamines for the practice of the present invention can have the formula:

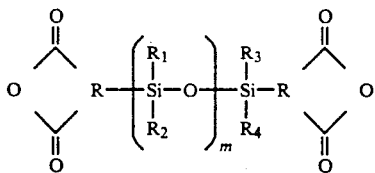

wherein $R_1$, $R_2$, $R_3$ and $R_4$ are independently selected from a substituted or unsubstituted aliphatic mono-radical of 1 to 12 carbon atoms on a substituted or unsubstituted aromatic mono-radical of 6 to 10 carbon atoms. Suitable radicals include —$CH_3$, —$CF_3$, —$(CH_2)_nCF_3$, —$CF_2$—$CHF$—$CF_3$,

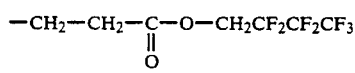

and —$C_6H_5$.

R is a tri-radical of the foregoing type. Suitable tri-radicals include —CH,

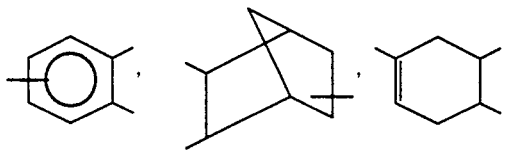

THE PROCESS FOR SOLUBLE POLYIMIDESILOXANES

The chemistry for reactions of organic diamines with organic dianhydrides has become well-known. The preparation of polyimidesiloxanes in the presence of the siloxane comonomers may sometimes require special techniques such as disclosed in copending application Ser. No. 07/307,016, filed Feb. 7, 1989, the disclosure of which is incorporated herein by reference.

EXAMPLES

EXAMPLES 1 AND 2

Two polyimidesiloxane compositions were prepared from BTDA, $U_s1$ and an α-w-diaminosiloxane. The siloxane block size was 9 units in Example 1 and 13 units in Example 2. The total siloxane content in the polyimidesiloxanes are shown in Table 1 along with the actual formulations. The procedure used is given below.

To 1-methyl-2-pyrrolidinone, commonly known as N-methyl pyrrolidone (NMP) (25 ml), was added BTDA and the mixture was stirred until the dianhydride had dissolved. Then the α-w-amino-siloxane was added and the solution stirred at ambient temperature for 2 hours. Then the diamine was added and the solution was stirred for another 16 hours. 15 ml of NMP was added to reduce the viscosity of the solution. The viscous solution was cast on to a Teflon coated mold which was subsequently heated at 140° C. for 4 hours and at 250° C. for 0.5 hours to remove solvent and complete the imidization.

In Example 2, 30 ml of NMP were used at the beginning of the reaction, and 10 ml of NMP were added later.

Two films were prepared and were tested and the results are shown in Table 1.

EXAMPLE 3

A polyimidesiloxane composition was prepared from BTDA, U and a siloxane diamine. The siloxane block size was 9 units and the total siloxane content in the polyimidesiloxane is shown in Table 1 along with the actual formulation. The procedure used is given below.

To 1-methyl-2-pyrrolidinone, commonly known as N-methyl pyrrolidone (NMP) (45 ml) was added BTDA and the mixture was stirred until the dianhydride had dissolved. Then, the α-w-amino-siloxane was added and the solution stirred for 2 hours. Finally, the diamine was added and the solution was stirred for another 16 hours. The viscous solution was cast on to a Teflon coated mold which was subsequently heated at 140° C. for 4 hours and at 250° C. for 0.5 hours to remove solvent and complete the imidization.

A film was prepared, and tested and the results are shown in Table 1.

EXAMPLES 4 and 5

Two polyimidesiloxane compositions were prepared from BTDA, the compound U and an α-w-diaminosiloxane. The siloxane block size was 9 units for Examples 3 to 5 and the total siloxane content in the polyimidesiloxane is shown in Table 1 along with the actual formulations. The procedure used is given below.

To 100 ml of 1-methyl-2-pyrrolidinone, commonly known as N-methyl pyrrolidone (NMP) and 10 ml toluene were added BTDA and the mixture was stirred until the dianhydride had dissolved. Then, the α-w-amino-siloxane was added and the solution stirred for 4 hours. Finally, the diamine was added and the solution was stirred for another 16 hours. The product was imidized by adding 0.375 gram of 1.5% DABCO (catalyst). The system was heated to 167° C. to remove the water created in the reaction. Small amounts of toluene were added to help remove the water. The reaction was completed when water take-off discontinued. About 40% of NMP was vacuum distilled. The system was cooled to room temperature. The product gelled. The product was precipitated with five times the amount deionized water and broken up in a blender. The fine particles were filtered to remove NMP, washed with deionized water. The product was treated with boiling deionized water. The product was oven dried at 100° C. The product was processed to remove most of the water and NMP. 7 grams of final product was dissolved in 35 ml NMP. The viscous solution was cast on to a Teflon coated mold which was subsequently heated at 140° C. for 4 hours and at 250° C. for 0.5 hours to remove solvent and complete the imidization.

Films of each product were prepared and tested and the results are shown in Table 1.

In the foregoing examples, $G_m$ has the formula:

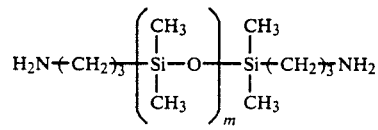

where m indicates the average number of units, as shown in Table 1, for example, $G^{7.5}$ and $G^{12}$.

$G^9$ siloxane monomer is an equilibrium product of one mole of $G^1$ with 2 moles of $D_4$ at 87°–90° C. $G^1$ has the following structure:

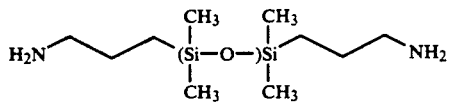

and D₄ is the cyclic tetramer having the formula:

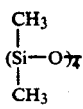

In the formula, and in the Examples, when G has a nominal value of 9 units, experimentally G had a value of about 8.5. Similarly, when G has a nominal value of 13 units, experimentally G had a value of about 12. The experimental measurements are done by silicon-29 NMR.

The solubility of the polyimidesiloxanes of the invention in low boiling, non-polar solvents, such as THF, NMP or diglyme is a function of the proportion of the siloxane component in the polyimidesiloxane and is also a function of the siloxane block size. Thus, the siloxane monomer is preferably present in a proportion and has a sufficient block size to render the polyimidesiloxane soluble in a solvent such as THF, NMP or preferably diglyme.

The polyimidesiloxanes of the invention are useful in a variety of applications in the micro-electronic industry. Such applications include use in the form of coatings as interlevel dielectrics and for encapsulation or passivations of semiconductors and hybrids integrated circuits. Coatings of the polyimidesiloxanes can be used in the fabrication of semiconductor devices in the following areas: (a) as a protective overcoat, (b) as an interlayer dielectric for multi-level devices, (c) as an alpha particle barrier, (d) as a as a non-implant mask, and (e) as an encapsulant. Most of these uses are described in detail by Lee and Craig in Polymer Materials for Electronic Applications, ACS Symposium, Ser. 184, page 108.

Other uses for the polyimidesiloxanes of the invention include wire and cable coatings, in fibers and films, and molded and extruded articles. Other uses include uses for liquid crystal alignment and for die-attach adhesives.

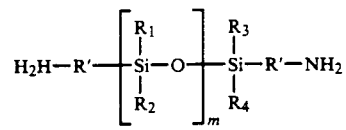

and siloxane dianhydrides having the formula

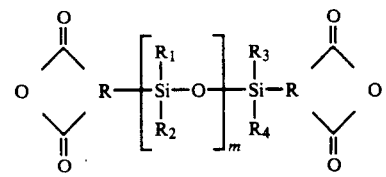

wherein the benzophenone dianhydride and the organic diamine(s) form an oligomer within said polyimidesiloxane of 1 to 10 repeating units, where m is 1 to 10, R is a tri-radical, and $R_1$, $R_2$, $R_3$, and $R_4$ are independently selected from substituted or unsubstituted aliphatic mono-radical of 1 to 12 carbon atoms or substituted or unsubstituted aromatic mono-radical of 6 to 10 carbon atoms and each R' is independently selected from substituted or unsubstituted aliphatic di-radical of 1 to 12 carbon atoms or substituted or unsubstituted aromatic di-radical of 6 to 10 carbon atoms.

2. The crystalline polymer of claim 1 wherein the number of repeating units is about 1 to 5.

3. The crystalline polymer of claim 1 wherein the organic diamine is bis-4(4-aminophenoxy) phenyl sulfone.

4. The crystalline polymer of claim 1 wherein the organic diamine is 2,2-bis-4[4-aminophenoxy phenyl]-propane.

5. The crystalline polymer of claim 1 wherein the number of said repeating units is 1 to 5.

6. The crystalline polymer of claim 1 wherein said siloxane monomer is a diamine.

7. The crystalline polymer of claim 6 wherein $R_1$, $R_2$, $R_3$, and $R_4$ are independently selected from the group consisting of —CH₃, —CF₃, —CH₂)$_n$CF₃, —C₆H₅, —CF₂—CHF—CF₃, and

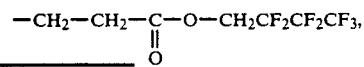

TABLE 1

| Example Number | BTDA Parts | Diamine Parts | Gm Parts | % Gm | Melting Point Tm (°C.) | Glass Transition Point Tg (°C.) | Water Absorption % at Room Temperature |
|---|---|---|---|---|---|---|---|
| 1 | (BUSl)₃.₅ G₉ | 2.90 | 3.02 | 1.64 | 21.6 | 343 | 230 | 1.01 |
| 2 | (BUSl)₃.₅ G₁₃ | 2.90 | 3.02 | 2.05 | 25.7 | 337 | 238 | 2.17 |
| 3 | (BU)₄ G₉ | 3.15 | 3.21 | 1.64 | 20.5 | 256 | 194 | 0.56 |
| 4 | (BU)₂.₆ G₉ | 9.44 | 8.66 | 6.90 | 27.6 | 283 | 165 | 0.54 |
| 5 | (BU)₂ G₉ | 9.19 | 7.81 | 8.00 | 32 | 266 | 150 | 0.45 |

I claim:

1. A crystalline polyimidesiloxane comprising a reaction product of benzophenone dianhydride and an organic diamine selected from the group consisting of bis-4(4-aminophenoxy) phenyl sulfone, 2,2-bis-4[4-aminophenoxy phenyl]-propane, and mixtures thereof, and a siloxane monomer selected from the group consisting of siloxane diamines having the formula where n is 1 to 10.

8. The crystalline polymer of claim 6 wherein each R' is selected from —CH₂—$_n$, —CF₂—$_n$, —CH₂)$_n$(CF₂)$_m$— and —C₆H₅—, where n and m=1 to 10.

9. The crystalline polymer of claim 1 wherein said siloxane monomer is a dianhydride.

10. The crystalline polymer of claim 9 wherein $R_1$, $R_2$, $R_3$, and $R_4$ are independently selected from the group consisting of —CH₃, —CF₃, —CH₂)ₙCF₃, —CF₂—CHF—CF₃,
—CH₂—CH₂—C(=O)—O—CH₂CF₂CF₂CF₃,
and —C₆H₅, where n is 1 to 10.
11. The crystalline polymer of claim 9 wherein R is selected from the group consisting of
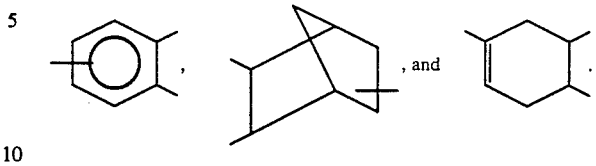
* * * * *

UNITED STATES PATENT AND TRADEMARK OFFICE
CERTIFICATE OF CORRECTION

PATENT NO. : 5,008,361
DATED : April 16, 1991
INVENTOR(S) : Chung J. Lee

It is certified that error appears in the above-identified patent and that said Letters Patent is hereby corrected as shown below:

Column 2, line 53, delete "$-CH_2-_n$, $-CF_2-_n$" and substitute -- $(CH_2)_n$, $(CF_2)_n$ --.

Column 3, line 12, delete "on" and substitute -- or --.

Column 3, line 23, delete "-CH," and substitute -- $-\overset{|}{\underset{|}{CH}}$, --

COLUMN 6:
Claim 7, line 3, delete "$-CH_2)_nCF_3$, $-CH_6H_5$," and substitute -- $(CH_2)_nCF_3$, $-CH_6H_5$, --"

Claim 8, line 2, delete "$-CH_2-_n$, $-CF_2-_n$, $-CH_2)_n(CF_2-$" and substitute $(CH_2)_n$, $(CF_2)_n$, $(CH_2)_n(CF_2-$ --.

Claim 10, line 3, delete "$-CH_2)_nCF_3$," and substitute -- $(CH_2)_nCF_3$, --.

COLUMN 8:
Claim 11, line 2, after "of" insert -- $-\overset{|}{\underset{|}{CH}}$, --.

Signed and Sealed this

Twenty-fifth Day of August, 1992

Attest:

DOUGLAS B. COMER

Attesting Officer

Acting Commissioner of Patents and Trademarks